Figure 1:
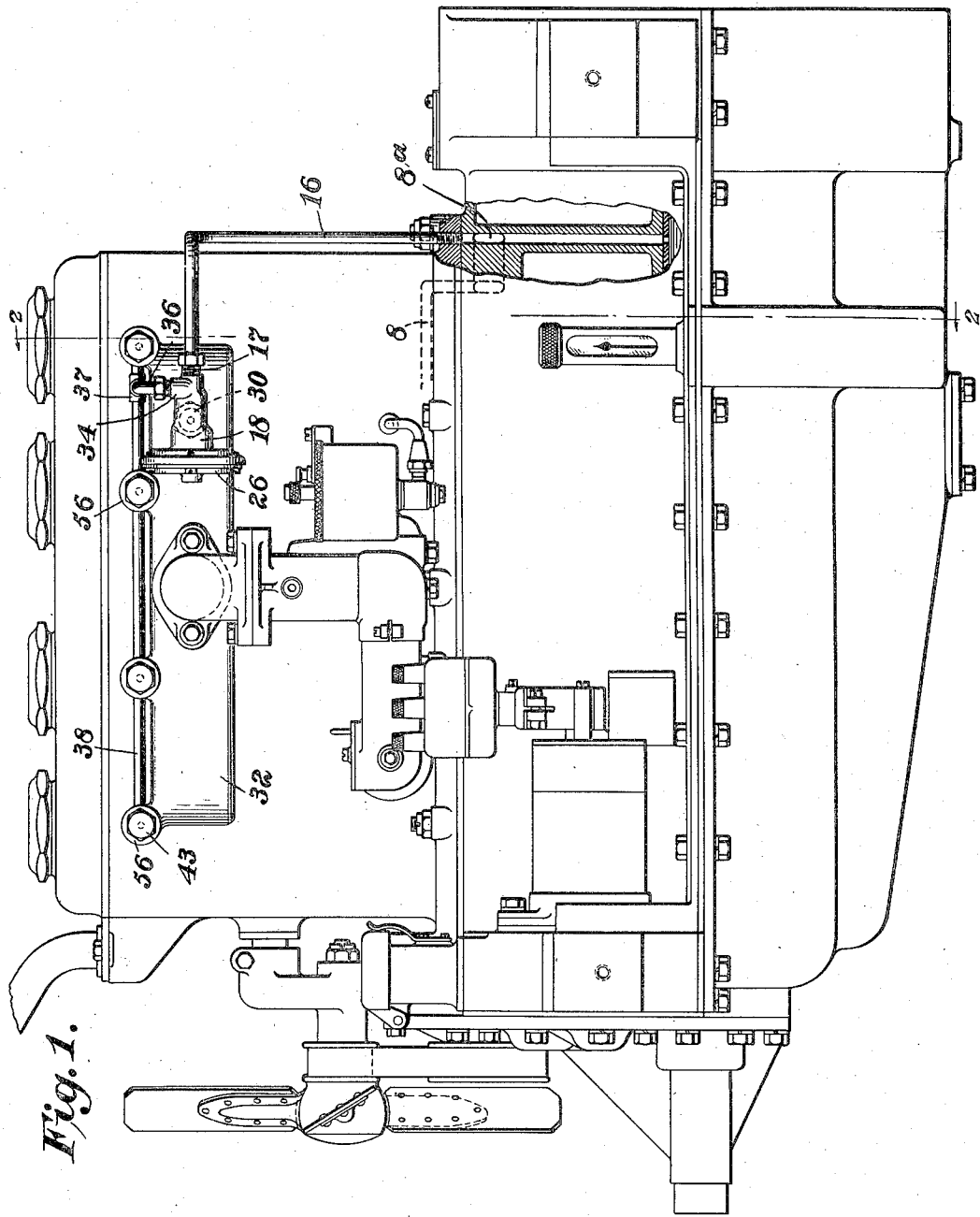

July 21, 1925.

C. P. HOLLISTER 1,547,039

LUBRICATING SYSTEM FOR INTERNAL COMBUSTION ENGINES

Filed Jan. 7, 1919      5 Sheets-Sheet 1

Inventor
Clarence P. Hollister;
by Eugene C. Brown
Atty.

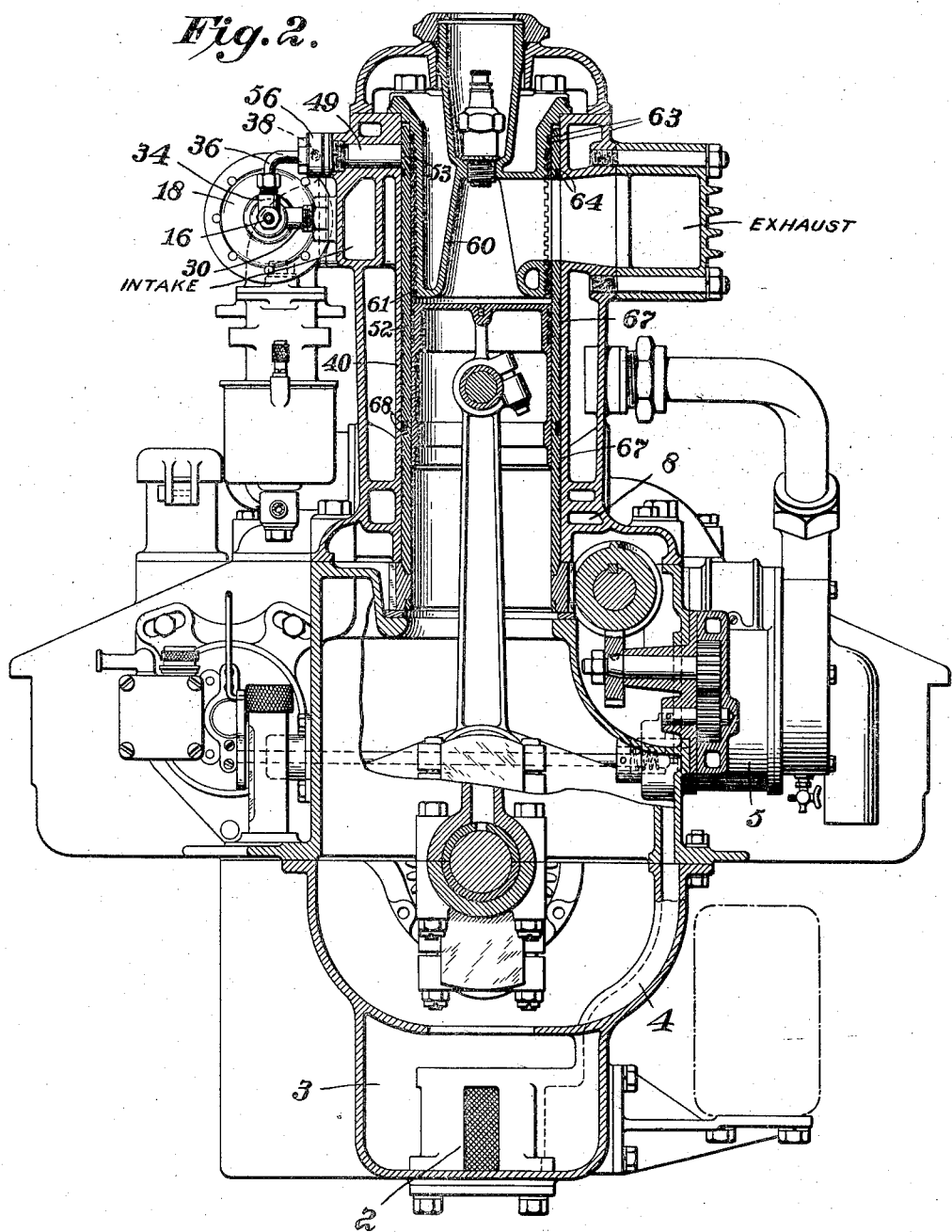

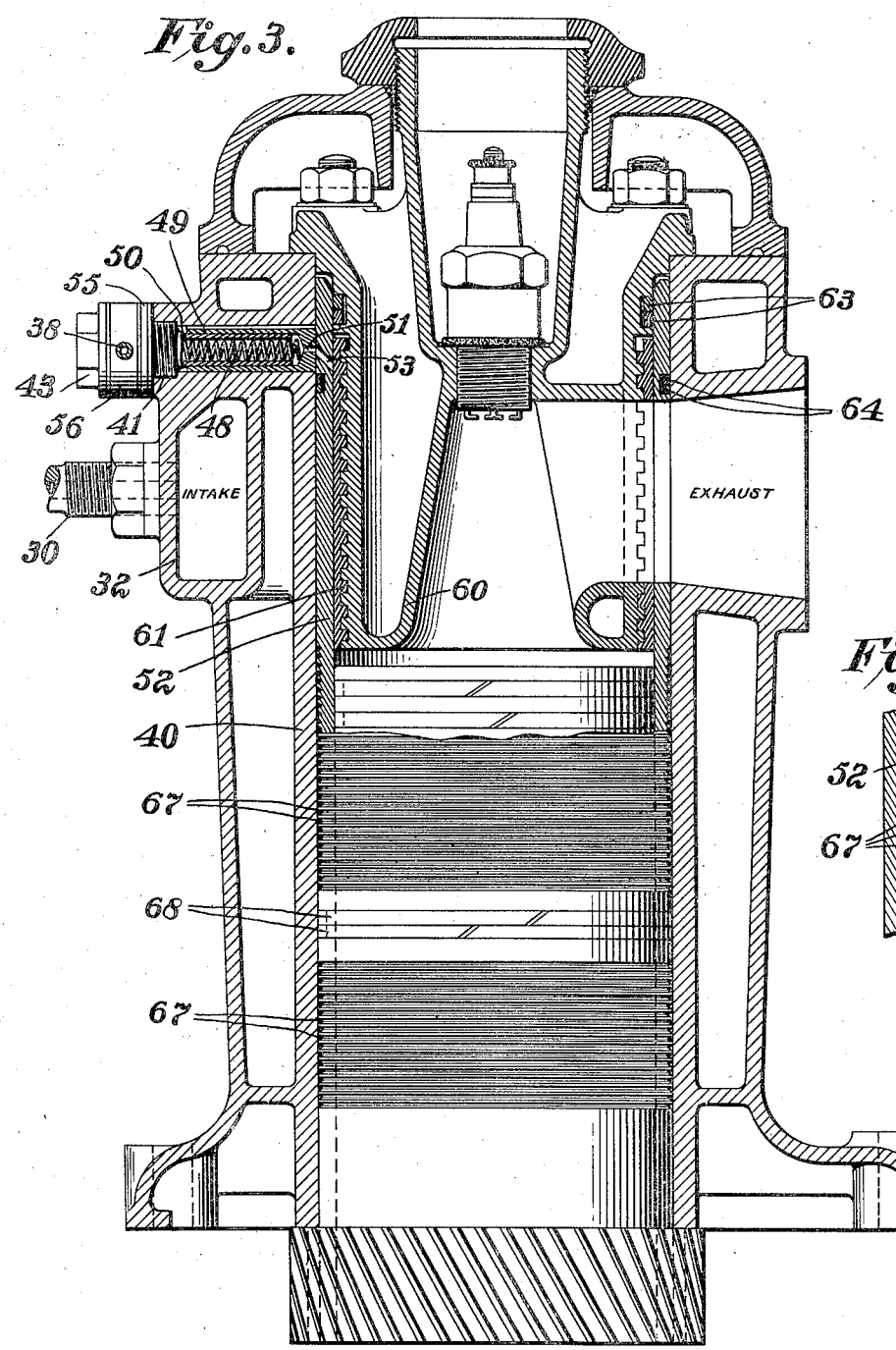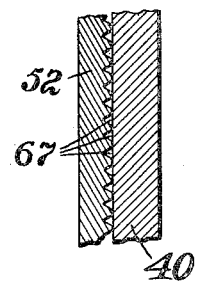

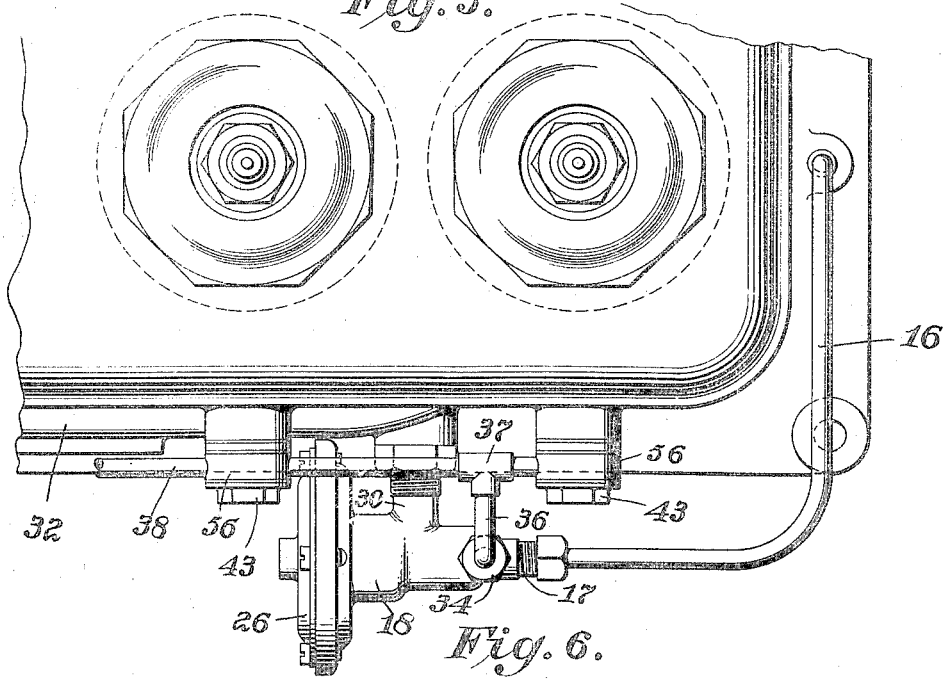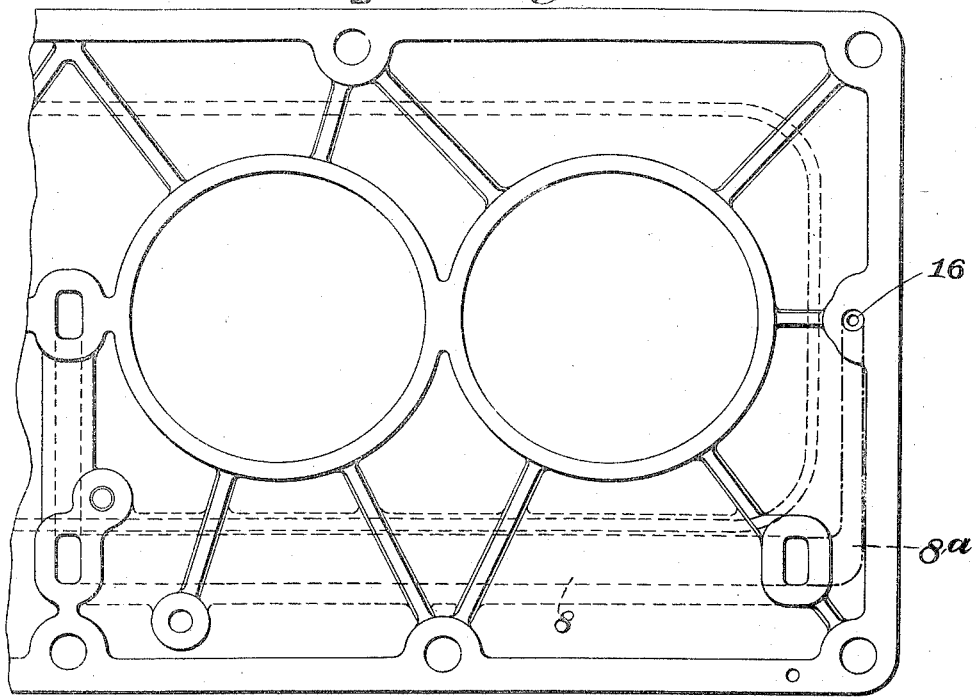

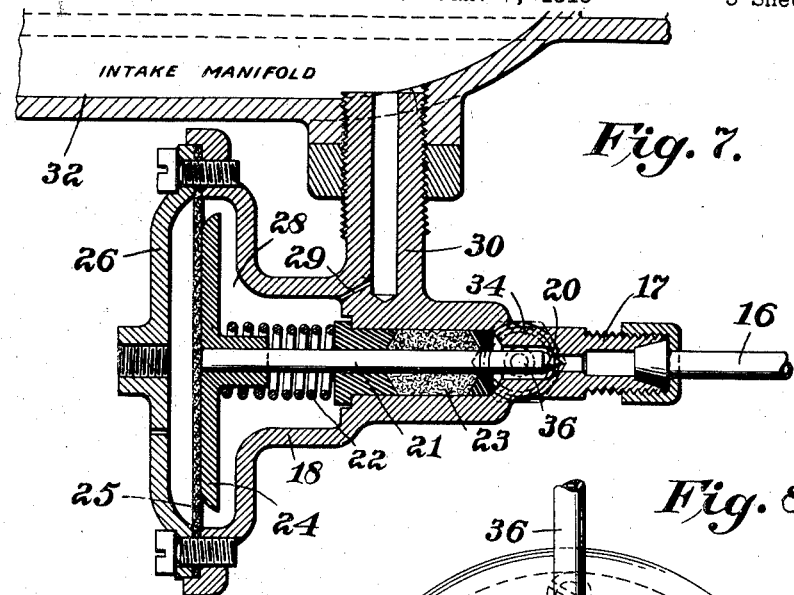
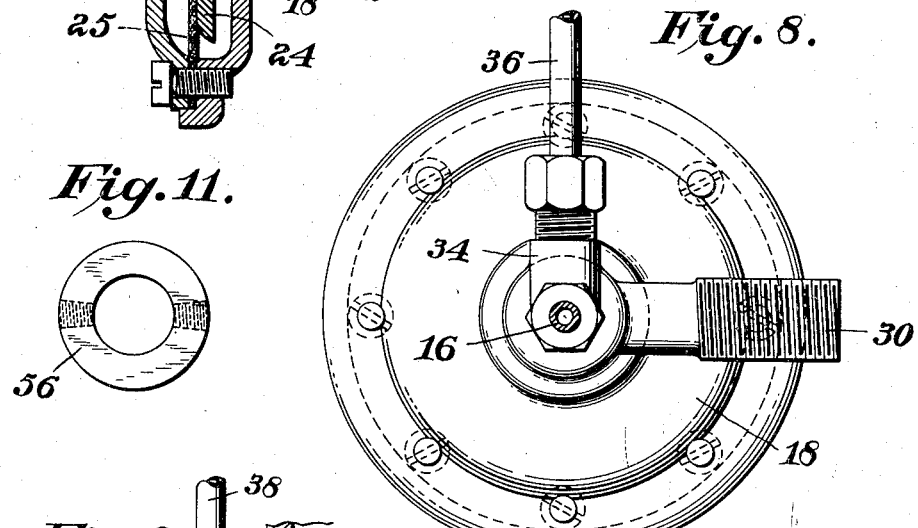
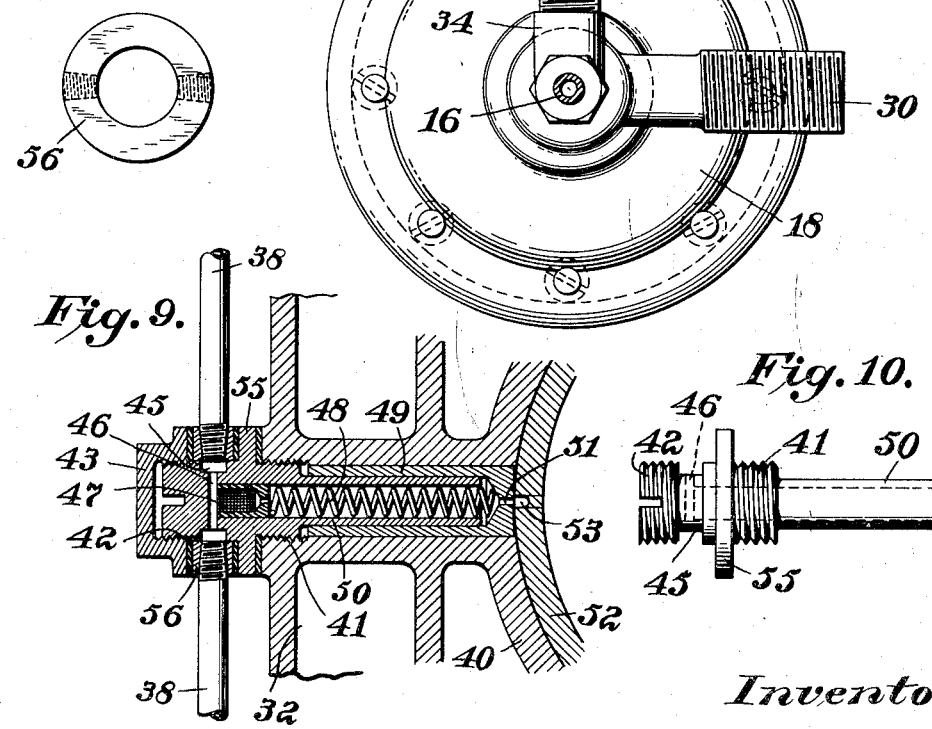

Patented July 21, 1925.

1,547,039

UNITED STATES PATENT OFFICE.

CLARENCE P. HOLLISTER, OF NEW YORK, N. Y.

LUBRICATING SYSTEM FOR INTERNAL-COMBUSTION ENGINES.

Application filed January 7, 1919. Serial No. 270,005.

*To all whom it may concern:*

Be it known that I, CLARENCE P. HOLLISTER, a citizen of the United States, residing at New York, in the county of New York and State of New York, have invented certain new and useful Improvements in Lubricating Systems for Internal-Combustion Engines, of which the following is a specification.

This invention relates to a system of lubrication for internal combustion engines having automatic oil regulation, and while more particularly designed for engines having rotary sleeve valves it may also be adapted to other types.

It is well known that the lubrication of internal combustion engines used in automobiles, aeroplanes and tractors has been far from satisfactory. In some cases insufficient lubrication of the piston and valves occurs either at high speeds or at low speeds and under different power conditions, and very commonly when a proper amount of oil is supplied when operating under normal power and speed conditions, too much oil is supplied when the engine is slowed down or is running idle, as when standing at the curb with the engine running or when a vehicle is stopping to take on or let off passengers.

The main object of my invention is to provide a lubricating system which will accurately regulate the supply of oil under all conditions of load and speed thereby avoiding the customary waste and preventing the emission of objectionable smoke from the exhaust.

My invention will be understood and its value will be appreciated from the following description in connection with the accompanying drawings in which—Figure 1 is a side elevation of an engine embodying the features of my lubricating system; Fig. 2 is a transverse vertical sectional view on the line 2—2 of Fig. 1; Fig. 3 is a vertical sectional view of one of the engine cylinders and showing my method of grooving the sleeve; Fig. 4 is an enlarged fragmentary detail showing the grooves in section; Fig. 5 is a fragmentary top plan view of the engine showing the manner of attaching the oil regulator to the manifold and cylinders; Fig. 6 is a bottom plan view of the corresponding portion of the engine, and Figs. 7 to 11 inclusive are enlarged detail views of certain parts of the oil regulator.

The lubricating oil is pumped from the strainer box 2 in the oil well chamber 3 in the base of the engine, through the oil duct 4, by means of the oil pump 5, and supplied to the main oil channel 8 extending longitudinally through the cylinder casting and from which branches lead to the crank and shaft bearings in the manner described in my prior application, one of which is indicated at $8^a$ in Fig. 1, the pump maintaining the oil in the main supply channel under the desired pressure.

The oil for the lubrication of the sleeve valves is conducted through a conduit or pipe 16 which is tapped at one end into the branch $8^a$ leading from the main oil supply channel 8, as indicated in Fig. 1 and at the other end is connected to the inlet nipple 17 of the regulator casing 18. The oil inlet channel of the regulator is controlled by a needle valve 20, having a shank 21 passing through a packing 23, and secured to a disk 24 attached to the diaphragm 25, secured between the annular rim of the casing and a cover plate 26. The diaphragm forms an air tight partition between the chamber 28 and the atmospheric pressure of the outside. Chamber 28 communicates through a minute aperture 29 with the passage in the nipple 30, the latter being threaded for insertion in a threaded opening in the wall of the engine intake manifold 32.

A branch nipple 34 extends laterally from the nipple 17 and connects the oil channel on the inner side of the needle valve with a pipe 36 which is joined by a T-coupling 37 to the plug supply pipe 38.

The oil from the pipe 38 is conveyed to the valves through hollow plugs which pass through openings in the cylinder walls 40, these plugs being shown in detail in Figs. 9 and 10. The head is provided with a threaded part 41 to engage threads in the opening in the cylinder wall and threads 42 to receive a cap nut 43. An annular groove 45 communicates with the bore of the plug through a duct 46. A strainer cup 47, adapted to hold a small roll of gauze, is held in place in the bore of the plug by a spiral spring 48, which bears at its opposite end against the end wall of a sleeve 49 which telescopes over the stem 50 of the plug and is provided with an aperture 51, which communicates during each revolution of the sleeve valve 52 with a duct 53 passing through the valve wall.

The oil pipe 38 is formed in sections, having threaded ends which screw into diametrically opposite threaded openings in washers 56 which may be made of copper or other suitable material and fit snugly over the head of the plug and are secured between a collar 55 on the plug and the lock nut 43, the joints being made tight by interposed gaskets. The inner periphery of the washer 56 cooperates with the groove 45 in each plug to form an annular channel connecting the opposite sections of the pipe 38, while the duct 46 connects this channel with the passage through the hollow plug, thereby placing the plugs in the several cylinders in communication with the branch pipe 36 leading from the oil regulator.

The operation of the mechanism which regulates or controls the flow of oil supplied to the engine valves through the hollow plugs 50 will be readily understood from the foregoing detailed description of the structural parts. The oil pump maintains a constant supply of oil at the desired pressure in the oil supply pipe 16 connected to the regulator. When the throttle is wide open and the engine is exerting its full power, the air pressure within the regulator chamber 28 is substantially atmospheric and the diaphragm 25 will be held in outward position, thereby maintaining the needle valve retracted in the open position so that the oil flows freely from the pipe 16, through the branch 36 to the several oil plugs. When the throttle is closed the suction of the engine causes a rarefaction in the manifold 32 and therefore also in the chamber 28. Atmospheric pressure upon the outer side of the diaphragm forces the latter inward against the tension of the spring 22, thereby closing the needle valve 20 against its seat and shutting off the supply of oil. Under this condition the engine runs idle and requires very little lubrication. I have found that the engine may run idle for long periods without additional lubricating oil.

In order that the opening and closing of the throttle in quick succession may not cause a rapid action of the needle valve 36, the hole 29 is made so very small or minute that it forms a restricted passage so that the change in pressure in the chamber 28 is retarded and the movements of the needle valve will therefore be slow or delayed in closing or opening. The purpose of this is to prevent an excessive flow of oil to the cylinders when the throttle is opened quickly and also to prevent the oil from being sucked out of the branch pipe 36 when the throttle is closed rapidly.

Between the rotary sleeve valve 52 and the depending cylinder head 60, I interpose a compression sleeve or ring 61 secured to the head by rectangular threads. Expansion rings 63 provide a gas tight joint between the upper end of the sleeve valve and the head above the compression ring and the rings 64 seal the joint between the sleeve valve and the cylinder wall above the inlet and exhaust ports.

There is a tendency for the oil to be drawn up between the sleeve valve and the cylinder wall during the suction stroke and to be blown out during the compression and power strokes. To obviate this difficulty I provide two series of fine shallow grooves 67 which are preferably annular but may be spiral, and which are V-shape with the outer edges cut away or flattened as indicated in the enlarged fragmentary section, Fig. 4. I have found that while these shallow flat topped grooves serve to retain the oil, they effectually prevent the oil from being forced longitudinally along the surface. To further prevent this action I provide expansion rings 68 between the two sets of surface grooves.

I claim:—

1. A lubricating system for internal combustion engines, comprising an oil supply conduit, a valve controlling the passage therein, and means for governing said valve in accordance with the pressure in the intake manifold of the engine, said means including a restricted passage which prevents a sudden action of the governing means and produces a delayed action of the valve.

2. A lubricating system for internal combustion engines, comprising an oil supply conduit, a valve controlling the passage therein, the valve casing being connected to the engine intake manifold through a restricted passage which prevents sudden changes in fluid pressure in said casing, a diaphragm within said casing subjected to the fluid pressure therein, and means connecting the diaphragm to the stem of said valve, which prevents the sudden action of the governing means and produces a delayed action of the valve.

3. A lubricating system for internal combustion engines, comprising an oil supply conduit, means for maintaining a flow of oil therethrough, means connecting said conduit with apertures in the walls of the engine cylinders, sleeve valves in the cylinders provided with openings adapted to register with said apertures during each stroke of the engine, a valve controlling the passage in the conduit, the valve casing being connected to the intake manifold through a restricted passage which prevents sudden changes in fluid pressure in said casing, a diaphragm within said casing subjected to the fluid pressure therein, and means connecting the diaphragm to the stem of said valve, which prevents the sudden action of the governing means and produces a delayed action of the valve.

In testimony whereof I affix my signature.

CLARENCE P. HOLLISTER.

Witnesses:
JAMES F. DAVIS,
EDGAR WILLIAMS.